(12) United States Patent
Counterman

(10) Patent No.: US 9,231,940 B2
(45) Date of Patent: Jan. 5, 2016

(54) CREDENTIAL LINKING ACROSS MULTIPLE SERVICES

(71) Applicant: Verizon Patent and Licensing Inc., Arlington, VA (US)

(72) Inventor: Raymond C Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/106,913

(22) Filed: Dec. 16, 2013

(65) Prior Publication Data
US 2015/0172261 A1   Jun. 18, 2015

(51) Int. Cl.
H04L 29/06        (2006.01)
(52) U.S. Cl.
CPC ................................. H04L 63/0815 (2013.01)
(58) Field of Classification Search
None
See application file for complete search history.

(56) References Cited

U.S. PATENT DOCUMENTS

| | | | |
|---|---|---|---|
| 7,137,006 B1* | 11/2006 | Grandcolas et al. | 713/180 |
| 7,155,614 B2* | 12/2006 | Ellmore | 713/183 |
| 7,958,347 B1* | 6/2011 | Ferguson | 713/155 |
| 8,201,217 B1* | 6/2012 | Begen et al. | 726/3 |
| 2004/0128506 A1* | 7/2004 | Blakley et al. | 713/170 |
| 2006/0053296 A1* | 3/2006 | Busboom et al. | 713/182 |
| 2006/0178994 A1* | 8/2006 | Stolfo et al. | 705/50 |
| 2006/0206932 A1* | 9/2006 | Chong | 726/10 |
| 2006/0218628 A1* | 9/2006 | Hinton et al. | 726/8 |
| 2008/0021866 A1* | 1/2008 | Hinton et al. | 707/2 |
| 2008/0021997 A1* | 1/2008 | Hinton | 709/225 |
| 2009/0089625 A1* | 4/2009 | Kannappan et al. | 714/39 |
| 2009/0097661 A1* | 4/2009 | Orsini et al. | 380/279 |
| 2012/0170750 A1* | 7/2012 | Orsini et al. | 380/277 |
| 2013/0276085 A1* | 10/2013 | Sharaga et al. | 726/8 |
| 2014/0181939 A1* | 6/2014 | Bonnell | 726/7 |

* cited by examiner

*Primary Examiner* — Michael R Vaughan

(57) ABSTRACT

A first server device may receive, from a user device, a request to authenticate the user device for a first service using authentication credentials for a second service that is different than the first service; provide the authentication credentials to a second server device that provides the second service; receive from the second server device, and when the authentication credentials are valid for the second service, user information relating to a user of the user device; and provide, to the user device, an authentication response, associated with the user information, that provides authentication of the user device for the first service.

15 Claims, 12 Drawing Sheets

700

| Credentials | User Information | Token |
|---|---|---|
| Universal Credentials 1 | User 1 Information | Token 1 |
| Credentials 1/Service 1 | | |
| Credentials 2/Service 2 | | |
| Universal Credentials 2 | User 2 Information | Token 2 |
| Credentials 3/Service 1 | | |
| Credentials 4/Service 2 | | |
| Universal Credentials 3 | User 3 Information | Token 3 |
| Credentials 5/Service 1 | | |
| Credentials 6/Service 2 | | |

Fig. 7

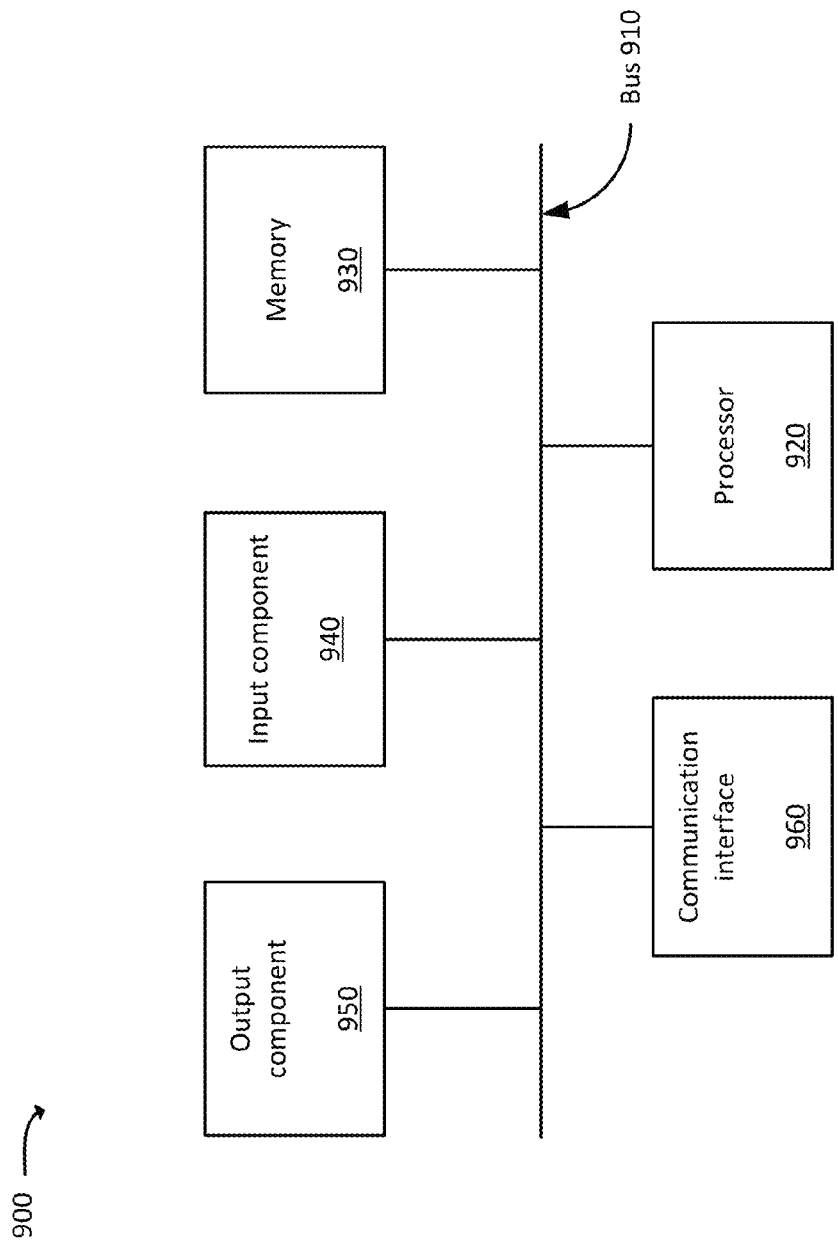

CREDENTIAL LINKING ACROSS MULTIPLE SERVICES

BACKGROUND

Authentication credentials are commonly used to authenticate users that wish to use network services, such as a network service provided by an application server. For example, a user may access application servers to manage subscriptions and/or user accounts (e.g., subscriptions and/or accounts relating to digital content streaming and/or services, telecommunications services, banking services, shopping services, etc.). Each application server may provide a user with access to a particular account based on receiving valid authentication credentials (e.g., a username, a password, etc.) that identify the user and authenticate the user's identity. Thus, a user may need to remember multiple sets of authentication credentials to access different application servers and different accounts associated with the user.

BRIEF DESCRIPTION OF THE DRAWINGS

FIG. 7 illustrates an example data structure that stores associations between credentials, user information, and tokens;

FIG. 9 illustrates example components of one or more devices, according to one or more implementations described herein.

DETAILED DESCRIPTION OF THE PREFERRED EMBODIMENTS

The following detailed description refers to the accompanying drawings. The same reference numbers in different drawings may identify the same or similar elements.

An application server (app server) may provide a user device with access to a service. Systems and/or methods, as described herein, may permit authentication credentials, associated with a first service (e.g., provided by a first app server), to be used to access a second service (e.g., provided by a second app server). A centralized authorization server may use authentication credentials, received from a user, to authenticate the user at the first app server. Based on the acceptance of the authentication credentials at the first app server, the centralized authentication server may direct the second app server to accept the user as authenticated. As an example, assume that the first app server maintains account information for telecommunications services for a user, while the second app server maintains account information for digital content services for the user. From the point of view of the user, the authentication credentials, used to access the account information for the telecommunications services, may be used to access the account information for the digital content services.

Figure 1A:
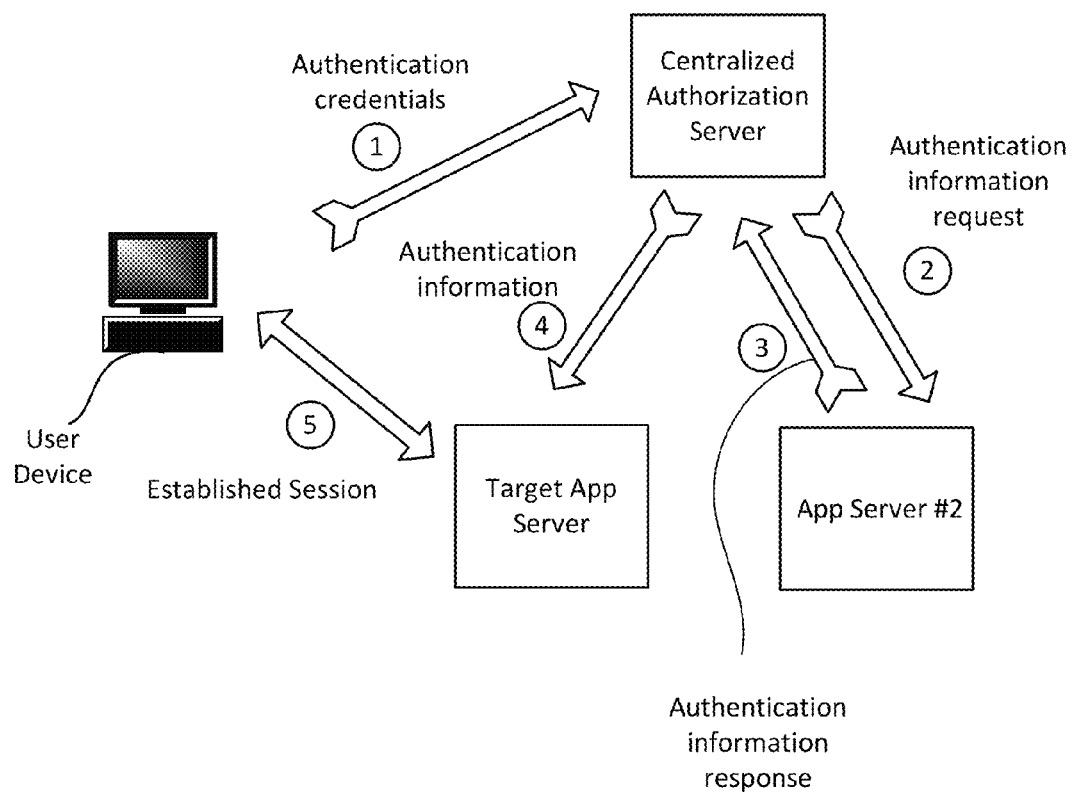
FIGS. 1A-1B illustrate an example overview of an implementation described herein.
Figure 1B:
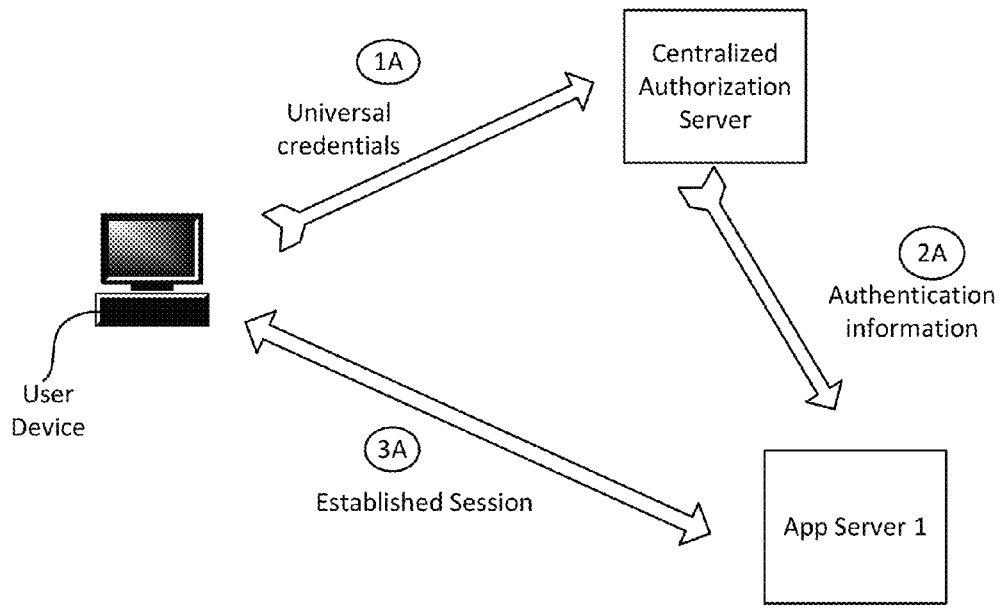
Figure 1B:
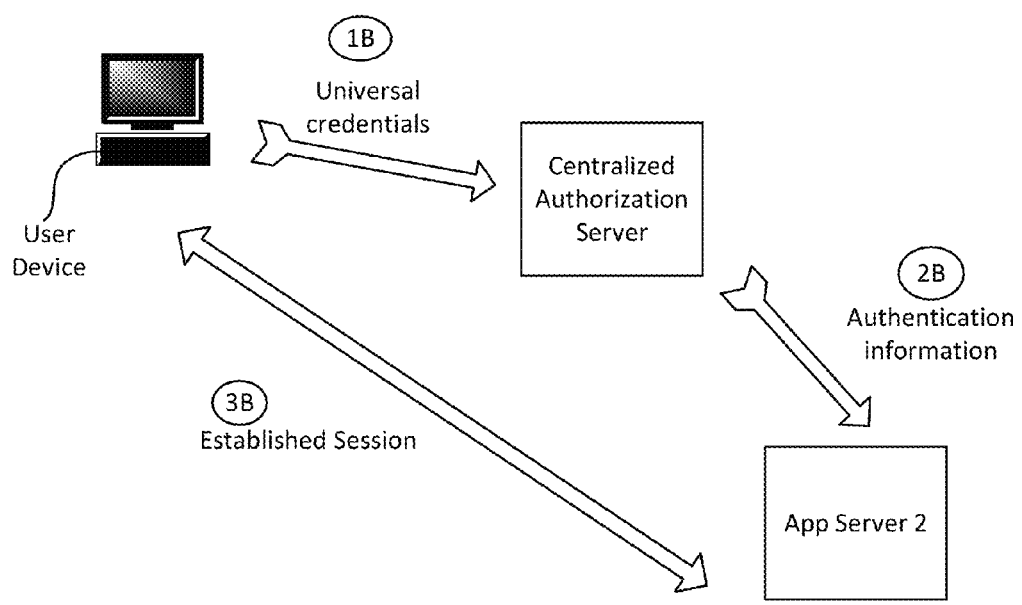

FIGS. 1A-1B illustrate example overviews of an implementation described herein. In FIG. 1A, a user, associated with a user device, would like to obtain services from a target application server. The user device may provide authentication credentials (e.g., a username, a password, etc.) to a centralized authorization server in order to access the service provided by a target app server (as shown in arrow "1"). Consistent with aspects described herein, the authentication credentials may be credentials that are not associated with the service provided by the target app server, but are associated with another service provided by another app server (e.g., app server #2) Based on receiving the authentication credentials, the centralized authorization server may identify app server #2 as the app server that is associated with the particular credentials that are provided by the user.

In some implementations, the centralized authorization server may identify app server #2 based on a format of the authentication credentials. As an example, assume that the authentication credentials include the username "jsmith@domain.com." Given this assumption, the centralized authorization server may identify the particular app server #2 that may validate authentication credentials for usernames including the e-mail domain of "domain.com." As another example, assume that the authentication credentials include a telephone number. Given this assumption, the centralized authorization server may identify the particular app server #2 that may validate authentication credentials based on a telephone number.

Based on identifying app server #2, the centralized authorization server may provide a request for authentication information to app server #2 (as shown in arrow "2"). In some implementations, the request for the authentication information may include the authentication credentials and a request for authentication information. In some implementations, the authentication information may include information that identifies that the target app server may use to authorize the user to access the service associated with the target app server. In some implementations, the authentication information may include user information, such as the user's name, address, and/or other information that the target app server may use to identify the user. Additionally, or alternatively, the authentication information may include an anonymous user identifier that the target app server may use to authenticate the user to access the service associated with the target app server. App server #2 may validate the authentication credentials and may provide a response to the authentication information request, including the authentication information (as shown in arrow "3").

As further shown in FIG. 1A, the centralized authorization server may provide the authentication information to the target app server (as shown in arrow "4"). Based on receiving the authentication information, the target app server may identify that the user is authorized to access the service, associated with the target app server, and establish an authenticated session with the user device (as shown in arrow "5").

In some implementations, universal credential information may be registered to a user to permit the user to access a number of services associated with different app servers.

Referring to FIG. 1B, a user may direct a user device to provide universal credentials to the central authorization server (as shown in arrow "1A"). For example, the user device may provide the universal credentials as part of a request to access a first app server (e.g., app server 1). Based on receiving the universal credentials, the central authorization server may validate the universal credentials (e.g., when the universal credentials received by the user device match universal credentials stored by the central authorization server). The centralized authorization server may then provide authentication information associated with the universal credentials to app server 1 (as shown in arrow "2A"). App server 1 may receive the authentication information, and may identify the user based on the authentication information. Based on identifying the user, the app server may establish a session with the user device to permit the user to access a service.

As further shown in FIG. 1B, the same universal credentials may be used to access a service provided by a second app server (e.g., app server 2). For example, as part of a request to access app server 2, the user device may provide the universal credentials to the centralized authorization server (as shown in arrow "1B"). The central authorization server may validate the universal credentials and may provide authentication information associated with the universal credentials to app server 1 (as shown in arrow "2B"). App server 2 may receive the authentication information, identify the user based on the authentication information and establish a session with the user device (as shown in "3B"). As a result, the same universal credentials may be used to access different services associated with multiple app servers, and the multiple app servers may identify the user based on authentication information, such as user data (e.g., a user's name, address, account information, etc.). In some implementations, the centralized authorization server may store a user's credentials from multiple services and link the credentials together such that one set of credentials may be used to access the multiple services.

Figure 2:
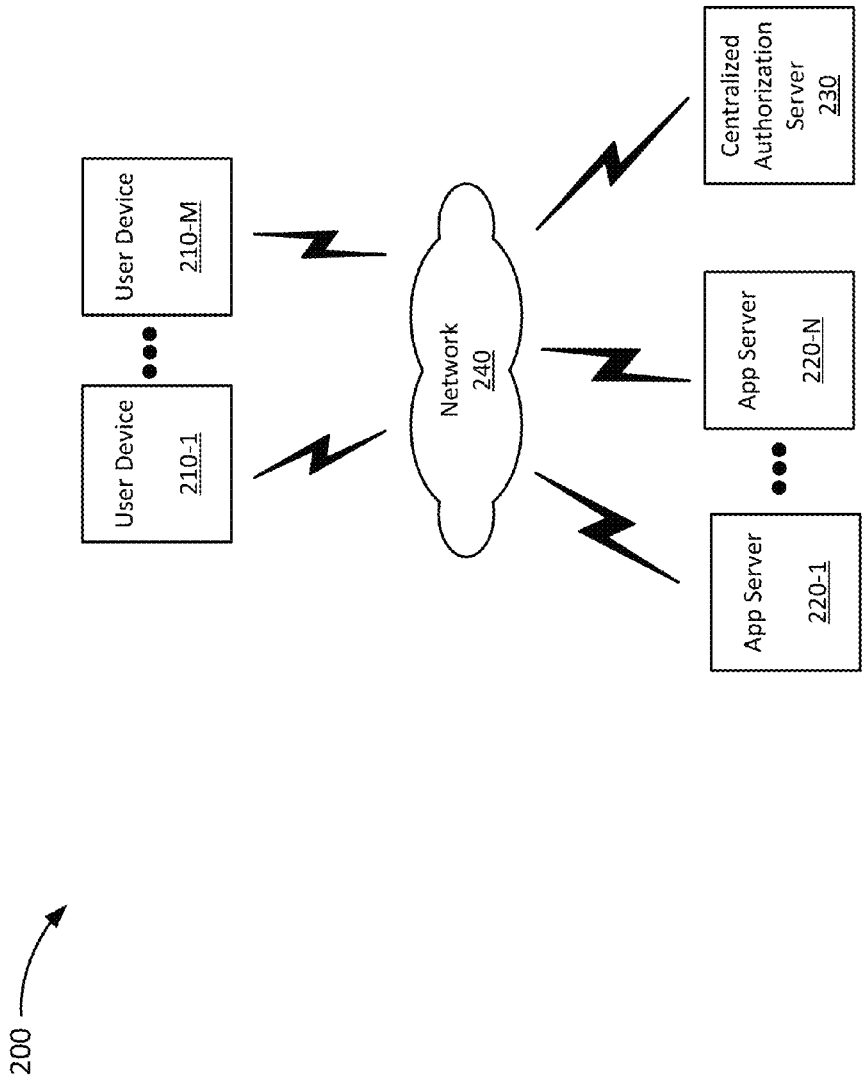
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M≥1), app servers 220-1 through 220-N (where N≥1), centralized authorization server 230, and network 240.

User device 210 may include a device capable of communicating via a network, such as network 240. For example, user device 210 may correspond to a mobile communication device (e.g., a smart phone or a personal digital assistant (PDA)), a portable computer device (e.g., a laptop or a tablet computer), a set-top box, a server device, a desktop computing device, and/or another type of computing device. User device 210 may communicate with app server 220 to access account information, subscription information, and/or some other information regarding a user of user device 210. Additionally, or alternatively, user device 210 may communicate with app server 220 to access a service provided by app server 220 (e.g., a service that the user may be permitted to access). User device 210 may communicate with centralized authorization server 230 to request access to app server 220.

App server 220 may include one or more computing devices, such as a server device or a collection of server devices. In some implementations, app server 220 may maintain account and/or subscription information for one or more users. For example, app server 220 may maintain information relating to users' subscriptions and/or accounts with a service provider, such as a telecommunications services account, a content services account, a banking account, etc. In some implementations, app server 220 may store user information to uniquely identify a user, such as the user's name, telephone number, address, account number, etc. In some implementations, app server 220 may provide access to user accounts and/or subscriptions. Additionally, or alternatively, app server 220 may provide access to an application or service.

In some implementations, app server 220 may receive authentication credentials from centralized authorization server 230 and validate the authentication credentials (e.g., determined that the authentication credentials match authentication credentials stored by app server 220). App server 220 may provide user information corresponding to the authentication credentials for storage by centralized authorization server 230. App server 220 may receive a token from user device 210, provide the token to centralized authorization server 230, and receive user information based on providing the token. App server 220 may identify a particular user and/or a particular account based on the user information. App server 220 may establish a session with user device 210, and provide access to the identified particular account. Additionally, or alternatively, app server 220 may provide access to a service based on receiving the token from user device 210, and without receiving user information (e.g., when app server 220 provides a service that does not depend on the user information). In some implementations, app server 220 may provide access based on receiving user information from centralized authorization server 230.

Centralized authorization server 230 may include one or more computing devices, such as a server device or a collection of server devices. In some implementations, centralized authorization server 230 may receive authentication credentials from user device 210 as part of a request to access app server 220 by user device 210. In some implementations, centralized authorization server 230 may validate the authentication credentials, and provide app server 220 with information that app server 220 may use to authorize user device 210 to access the service.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
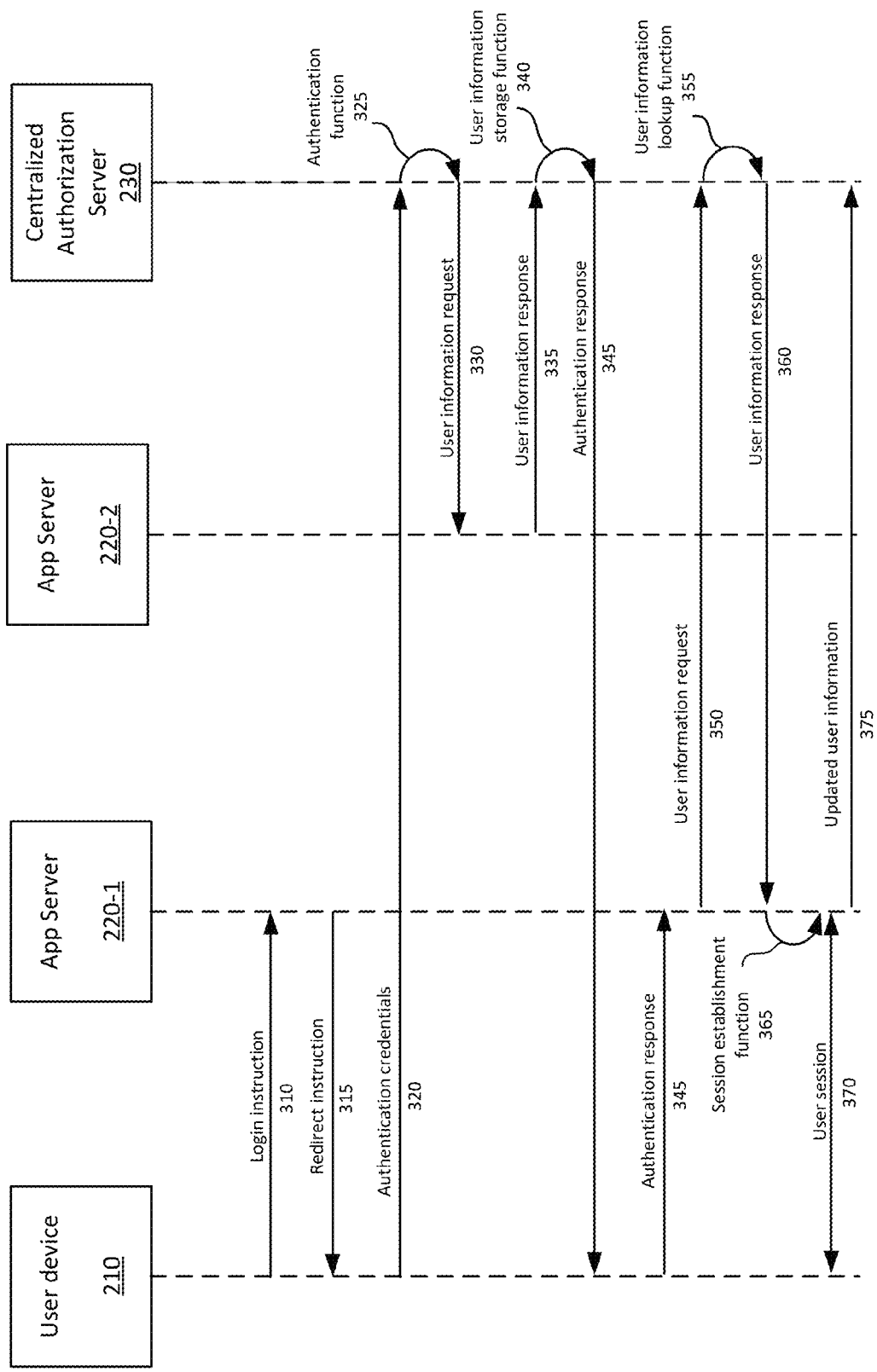
FIGS. 3A and 3B illustrates a signal flow diagram of example operations for providing access to a first service based on receiving authentication credentials associated with a second service.
Figure 3B:
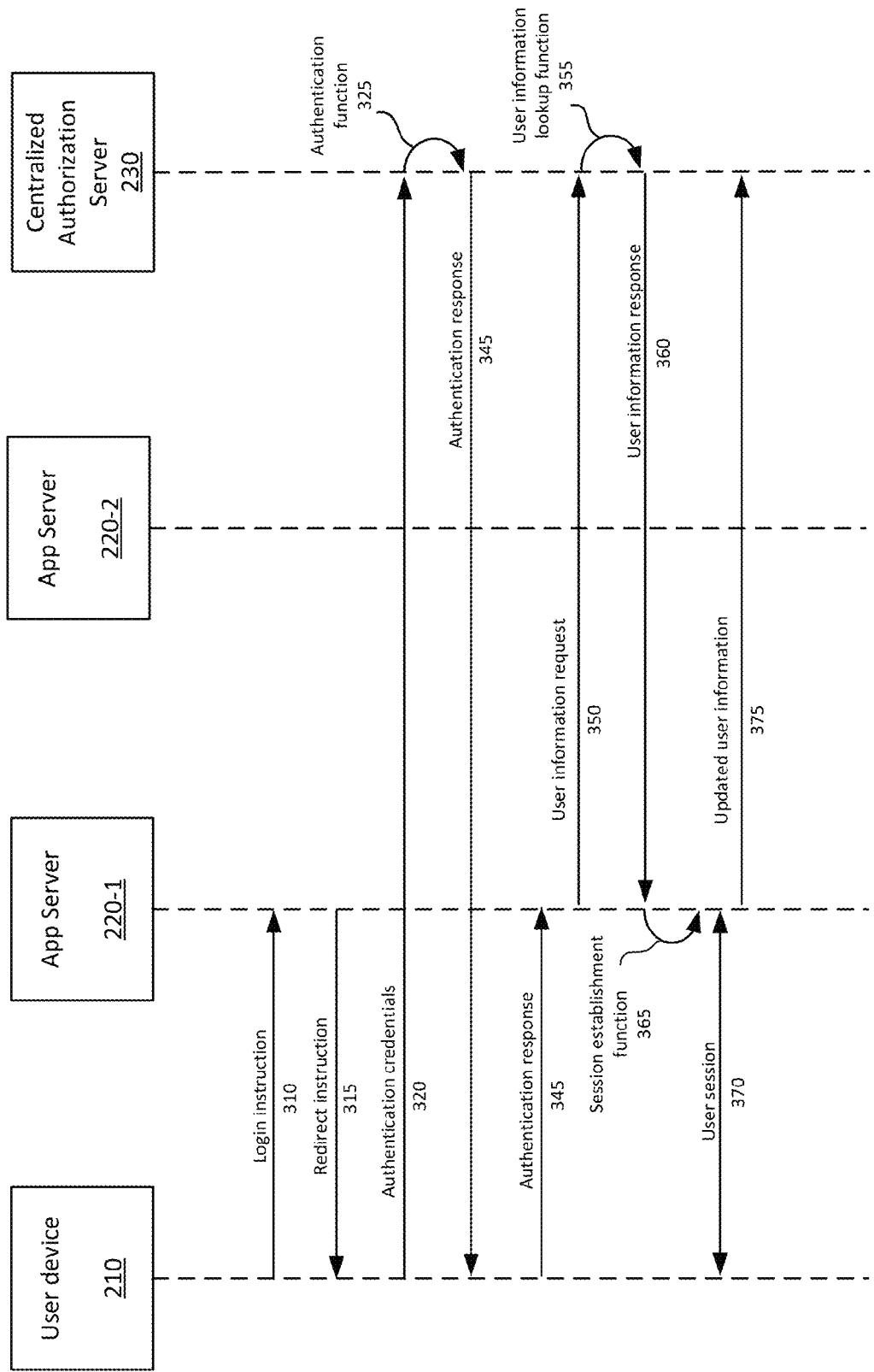

FIGS. 3A and 3B illustrates a signal flow diagram of example operations for providing access to a first service based on receiving authentication credentials associated with a second service. In FIGS. 3A and 3B, the first service may be associated with a target app server 220 (e.g., app server 220-1) while a second service may be associated with an authenticating app server 220 (e.g., app server 220-2).

As shown in FIG. 3A, user device 210 may provide login instruction 310 to app server 220-1. In some implementations, login instruction 310 may include a request to access a service associated with app server 220-1. For example, user device 210 may provide login instruction 310 from a login page, associated with app server 220-1, via a web browser, an application, or the like. As further shown in FIG. 3A, app server 220-1 may provide redirect instruction 315 based on receiving login instruction 310. In some implementations, redirect instruction 315 may redirect user device 210 from a login page of app server 220-1 to a login page associated with centralized authorization server 230. In some implementations, a user of user device 210 may input authentication credentials 320, and user device 210 may provide authentication credentials 320 to centralized authorization server 230. In FIG. 3A, assume that authentication credentials 320 include credentials for a service associated with app server 220-2, but not with the service associated with app server 220-1.

Based on receiving authentication credentials 320, centralized authorization server 230 may authenticate login credentials 320. For example, centralized authorization server 230 may attempt to validate authentication credentials 320. For example, centralized authorization server 230 may determine that authentication credentials 320 are valid when authentication credentials, stored by centralized authorization server 230, match authentication credentials 320. As described in greater detail below with respect to FIG. 3B, centralized authorization server 230 may provide an authentication response to user device 210 based on validating authentication credentials 320.

In FIG. 3A, assume that centralized authorization server 230 fails to validate authentication credentials 320 (e.g., when centralized authorization server 230 does not store authentication credentials 320). Given this assumption, centralized authorization server 230 may identify a particular app server 220 associated with the authentication credentials 320 (e.g., an app server 220 that may validate authentication credentials 320). In some implementations, centralized authorization server 230 may identify the particular app server 220 based on a format of authentication credentials 320 and/or based on some other information included in authentication credentials 320. For example, centralized authorization server 230 may identify the particular app server 220 based on a domain name included in authentication credentials 320 (e.g., when login credentials 320 include an e-mail address and/or some other information that identifies a domain name). Additionally, or alternatively, centralized authorization server 230 may identify the particular app server 220 based on a telephone number included in authentication credentials 320. Additionally, or alternatively, centralized authorization server 230 may identify the particular app server 220 based on some other information.

In FIG. 3A, assume that centralized authorization server 230 identifies that app server 220-2 is associated with the authentication credentials 320. Given this assumption, centralized authorization server 230 may provide user information request 330 to app server 220-2. In some implementations, user information request 330 may include authentication credentials 320 and a request for user information associated with authentication credentials 320. App server 220-2 may validate authentication credentials 320 (e.g., when authentication credentials 320 match authentication credentials stored by app server 220-2). App server 220-2 may provide user information response 335 based on receiving user information request 330 and validating authentication credentials 320. In some implementations, user information response 335 may include user information for a user associated with authentication credentials 320. For example, user information response 335 may include the user's name, address, account number, and/or some other information that may identify the user. In some implementations, user information response 335 may not include information that identifies the user, but may include information identifying services that the user may be permitted to access. Additionally, or alternatively, user information response 335 may include an anonymous ID associated with the user.

In some implementations, centralized authorization server 230 may not identify a particular app server 220 with which to provide user information request 330. In the case where centralized authorization server 230 does not identify the particular app server 220, centralized authorization server 230 may provide user information request 330 to multiple app servers 220. For example, centralized authorization server 230 may provide user information request 330 to app server 220-1 and to app server 220-2. App server 220-1 and app server 220-2 may each perform a validation function to validate authentication credentials included in user information request 330. As an example, assume that app server 220-1 fails to validate the authentication credentials, and that app server 220-2 validates the authentication credentials. Given this assumption, app server 220-2 may provide user information response 335 to centralized authorization server 230. In some implementations, centralized authorization server 230 may provide user information request 330 to any number of app servers 220.

As further shown in FIG. 3A, centralized authorization server 230, based on receiving user information response 335, may store the user information, included in user information response 335 (e.g., as part of user information storage function). In some implementations, centralized authorization server 230 may receive user information response 335 from multiple app servers 220 (e.g., when the multiple app servers 220 validate authentication credentials included in user information request 330). Centralized authorization server 230 may store user information included in multiple user information responses 335, as part of user information storage function 340.

Centralized authorization server 230 may further generate and provide authentication response 345 to user device 210. In some implementations, authentication response 345 may include information that app server 220-1 may use to authorize user device 210 to access the service associated with app server 220-1. For example, authentication response 345 may include user information, such as a user's name, address, or the like. Additionally, or alternatively, authentication response 345 may not include user information, but may include information identifying that the user is authorized to access the service (e.g., an anonymous ID associated with the user, or the like). In some implementations, authentication response 345 may not include the user information, but may include a token that app server 220-1 may use to request the user information from centralized authorization server 230 (e.g., as described below with respect to user information request 350 and user information response 360). Additionally, or alternatively, the token may include the user information embedded in the token.

In some implementations, centralized authorization server 230 may generate the token based on receiving user information response 335. Further, centralized authorization server 230 may associate the token with the user information and with authentication credentials 320. For example, centralized authorization server 230 may store (e.g., in a data structure), information identifying the association between the token, the user information, and authentication credentials 320. In some implementations, the token may include a string of characters of any length of format. In some implementations, the token may include an expiration timestamp. In some implementations, centralized authorization server 230 may insert a signature (e.g., a hash value, a key, or the like) in the token. In some implementations, the token may include authentication information for the user (e.g., user information and/or an anonymous ID associated with the user). In some implementations, centralized authorization server 230 may generate an updated token after the token has expired, and may associate the updated token with the user information, and authentication credentials 320. For example, the updated token may include a different string of characters than the expired token.

Centralized authorization server 230 may provide authentication response 345 to user device 210. In some implementations (e.g., when authentication response 345 includes a token), centralized authorization server 230 may encrypt the token prior to providing the token to user device 210, and may transmit the token via a secure tunnel to prevent an unauthorized device from receiving the token. User device 210 may provide authentication response 345 to app server 220-1 after receiving authentication response 345.

If authentication response 345 does not include the user information, but includes a token (e.g., that does not include the user information), app server 220-1 may provide user information request 350 to centralized authorization server 230. In some implementations, user information request 350 may include the token, included in authentication response 345, and a request for user information associated with the token. Based on receiving user information request 350, centralized authorization server 230 may locate (e.g., in a data structure) the user information associated with the token (user information lookup function 355). Additionally, centralized authorization server 230 may validate the token when the token has been received before a time identified by the expiration timestamp of the token. Additionally, or alternatively, centralized authorization server 230 may validate the token by decrypting the token to identify a signature, and determining that the signature of the token matches the signature inserted by centralized authorization server 230.

Based on validating the token and locating the user information, centralized authorization server 230 may provide user information response 360, including the user information. Based on receiving user information response 360, app server 220-1 may identify an account, subscription information, authorized services, etc., based on the user information (session establishment function 365). For example, as described above, the user information may include a user's name, account number, address, etc. Additionally, or alternatively, the user information may not include information that may identify the user, but may include information identifying services that the user may access (e.g., an anonymous ID or the like).

Based on the user information, app server 220-1 may authorize the user to access the service, associated with app server 220-1. For example, app server 220-1 may authorize the user to access the service when app server 220-1 stores information identifying that the user (e.g., associated with the user information) is authorized to access the service. Based on authorizing the user to access the service, app server 220-1 may establish user session 370, and provide user device 210 with access to an account, subscription information, and/or other service via user session 370. In some implementations, app server 220-1 may determine that the user is not authorized, and may provide user device 210 with an indication that the user is not authorized to access the service (e.g., app server 220-1 does not store information indicating that user is authorized to access the service).

If, on the other hand, authentication response 345 includes the user information and/or a token having the user information embedded in the token, app server 220-1 may establish session 370 based on the user information included in authentication response 345. For example, app server 220-1 may establish session 370 without needing to request the user information from centralized authorization server 230 using the token (e.g., since user information response 345 includes the user information).

In some implementations, the user may update user information via user session 370. In some implementations, app server 220-1 may provide updated user information 375 to centralized authorization server 230 (e.g., when user information regarding the user and/or services that the user is permitted to access is changed). Centralized authorization server 230 may synchronize and store the updated user information so that centralized authorization server 230 stores up-to-date user information. Also, updated user information 375 may include authentication credentials for the user's account and/or service provided by app server 220-1.

In some implementations, centralized authorization server 230 may generate an association between a token and the authentication credentials of a first service associated with app server 220-1. That is, the token may be linked to the authentication credentials for the first service associated with the authentication credentials for a second service associated with app server 220-2. When the authentication credentials for the first service or the second service are received by centralized authorization server 230 (e.g., from user device 210 as part of a request to access to the first service or the second service), centralized authorization server 230 may provide the token (e.g., as part of authentication response 345), which may allow access to the first service of the second service. For example, the token may include an indication that the user may access the first service or the second service. As a result, authentication credentials for the first service may be used to access the second service, or vice versa.

In some implementations, operations shown in FIG. 3A may be performed when a user requests to access the first service, associated with app server 220-1 and provides authentication credentials 320 associated with the first service. For example, centralized authorization server 230 may provide user information request 330 to app server 220-1, receive user information response 335 (e.g., assuming app server 220-1 validates authentication credentials 320), store user information included in user information response 335, generate and associate a token with the user information, and provide the user information when receiving the token as part of user information request 350. As a result, user device 210 may access app server 220-1 when providing authentication credentials 320 associated with either the first service or the second service. Further, centralized authorization server 230 may generate an association between authentication credentials for the first service and the second service.

As described above, centralized authorization server 230 may store authentication credentials 320 and associate authentication credentials 320 with user information. Referring to FIG. 3B, user device 210 may provide authentication credentials 320 in a similar manner as described above. In FIG. 3B, assume that centralized authorization server 230 has associated authentication credentials 320 with user information. Given this assumption, centralized authorization server 230 may validate authentication credentials 320 as part of authentication function 325, and provide user information as part of authentication response 345. In a similar manner as described above, user device 210 may provide a token, included in authentication response 345, to app server 220-1, and app server 220-1 may provide the token as part of user information request 350. Centralized authorization server 230 may receive user information request 350, identify user information corresponding to the token, and provide user information response 360. App server 220-1 may then perform session establishment function 365, establish user session 370 with user device 210, and provide updated user information 375. Alternatively, app server 220-1 may establish session 370 without requesting the user information from centralized authorization server 230 using the token (e.g., when authentication response 345 includes the user information). Alternatively, app server 220-1 may establish session 370 when the token included in authentication response 345 includes an indication that user device 210 is permitted to access the service. As a result, centralized authorization server 230 may provide authentication response 345 without involving app server 220-2 once user information has been stored by centralized authorization server 230 and once the user information and/or token has been associated with authentication credentials 320.

While described as a first service being associated with app server 220-1 and a second service being associated with app server 220-2, in practice, the first service and the second service may be associated with a single app server 220. In the case where a single app server 220 is associated with multiple services, app server 220 may implement different identity and access managers for each service. In FIGS. 3A and 3B, operations performed by app server 220-1 may be performed by a first identity and access manager of app server 220, and operations performed by app server 220-2 may be performed by a second identity and access manager of app server 220.

Figure 4:
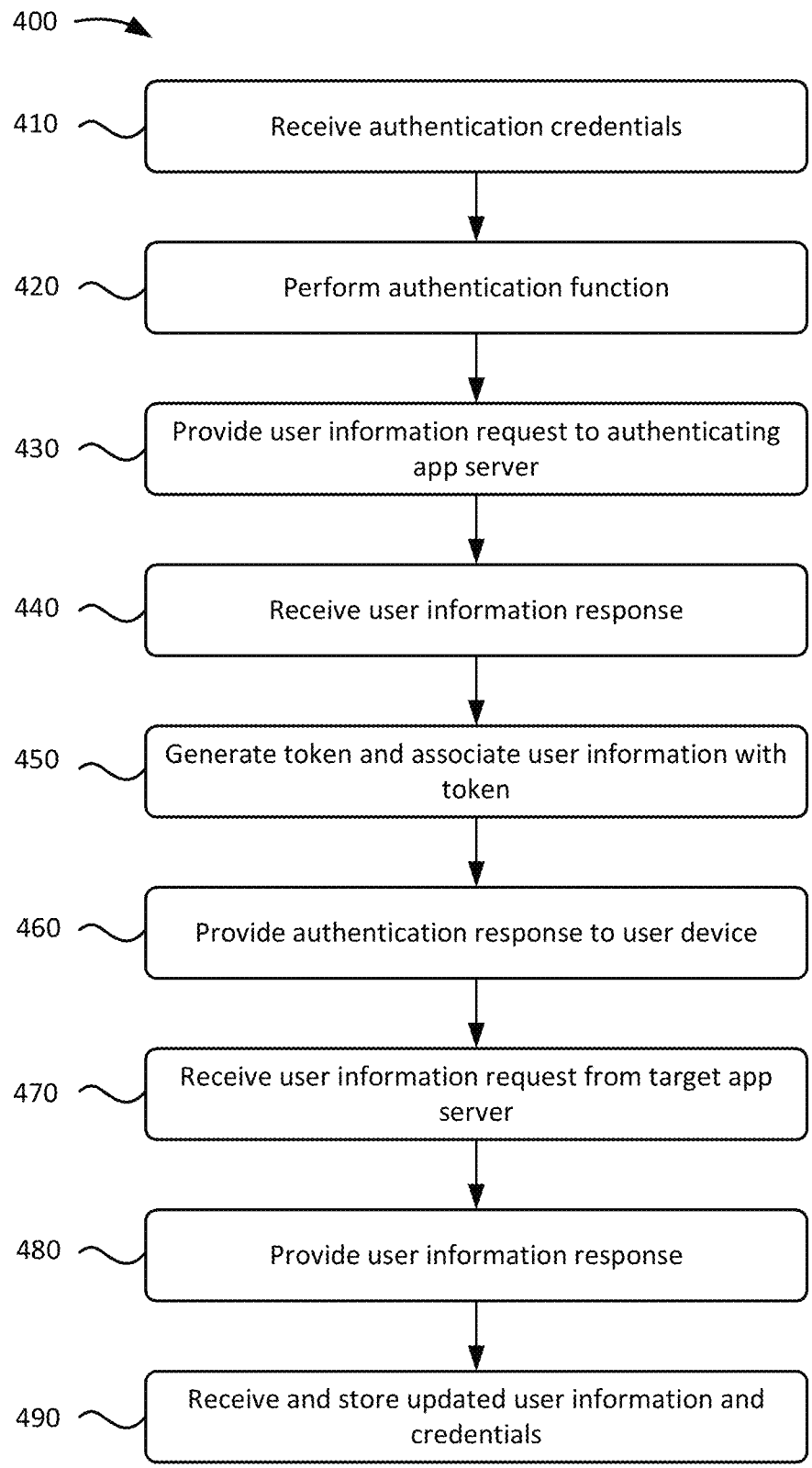
FIG. 4 illustrates a flowchart of an example process for obtaining user information, and associating the user information with a token.

FIG. 4 illustrates a flowchart of an example process 400 for obtaining user information, and associating the user information with a token. In one implementation, process 400 may be performed by one or more components of centralized authorization server 230. In another implementation, some or all of blocks of process 400 may be performed by one or more components of another device in environment 200 (e.g., user device 210 and/or app server 220), or a group of devices including or excluding centralized authorization server 230.

As shown in FIG. 4, process 400 may include receiving authorization credentials (block 410). For example, centralized authorization server 230 may receive authorization credentials from user device 210. As described above, user device 210 may provide authorization credentials after receiving redirect instruction 315. User device 210 may provide the login credentials as part of a request to access a target app server 220.

Process 400 may also include performing an authentication function (block 420). For example, as described above with respect to authentication function 325, centralized authorization server 230 may determine that authentication credentials 320 are valid when authentication credentials, stored by centralized authorization server 230, match authentication credentials 320. As described in greater detail below, centralized authorization server 230 may provide a token to user device 210 based on validating the authentication credentials.

In FIG. 4, assume that centralized authorization server 230 fails to validate the authentication credentials (e.g., when centralized authorization server 230 does not store authentication credentials 320). Given this assumption, centralized authorization server 230 may identify a particular app server 220 (e.g., an authenticating app server 220) as part of the authentication function. As described above, centralized authorization server 230 may identify the authenticating app server 220 based on a format of the authentication credentials and/or based on some other information included in the authentication credentials.

Process 400 may further include providing a user information request to the authenticating app server (block 430). For example, as described above centralized authorization server 230 may provide the user information request 330 to the authenticating app server 220. In some implementations, the user information request 330 may include authentication credentials 320 and a request for user information associated with the authentication credentials. In some implementations, the authenticating app server 220 may validate the authentication credentials (e.g., when the authentication credentials match authentication credentials stored by the authenticating app server 220) and provide a user information response.

Process 400 may also include receiving the user information response (block 440). For example, as described above, centralized authorization server 230 may receive the user information response from the authenticating app server 220. In some implementations, the user information response may include user information for a user associated with the authentication credentials. For example, the user information response may include the user's name, address, account number, and/or some other information that may identify the user. In some implementations, the user information response may not include information that identifies the user, but may include information identifying services that the user may be permitted to access.

Process 400 may further include generating a token and associating the user information with the token (block 450). For example, as described above, centralized authorization server 230 may store the user information, included in the user information response, and may generate a token. Further, centralized authorization server 230 may associate the token with the user information and with the authentication credentials. For example, centralized authorization server 230 may store (e.g., in a data structure), information that identifies the association between the token, the user information, and the authentication credentials. In some implementations, centralized authorization server 230 may insert a signature (e.g., a hash value, a key, or the like) in the token. The token may be used to indicate, to the target app server, that the user should be authenticated by the target app server 220. Additionally, or alternatively, the token may be used by target app server 220 to request user information corresponding to the token.

Process 400 may also include providing an authentication response to the user device (block 460). For example, centralized authorization server 230 may provide the authentication, to user device 210, based on validating the authentication credentials as described above in block 420. In some implementations, the authentication response may include the token. In some implementations, centralized authorization server 230 may encrypt the token prior to providing the token to user device 210, and may transmit the token via a secure tunnel to prevent an unauthorized device from receiving the token. Additionally, or alternatively, the authentication response may not include a token, but may include user information that target app server 220 may use to authorize the user to access the service associated with target app server 220. Additionally, or alternatively, the authentication response may include a token having information that app server 220 may use to authorize the user without needing to request user information from centralized authorization server 230. In some implementations, centralized authorization server 230 may provide the authentication response directly to target centralized authorization server 230 without involving user device 210.

Process 400 may further include receiving a user information request from the target app server (block 470). For example, as described above, centralized authorization server 230 may receive the user information request from target app server 220. In some implementations, the user information request may include the token and a request for user information associated with the token.

Process 400 may also include providing a user information response (block 480). For example, as described above, centralized authorization server 230 may locate (e.g., in a data structure) the user information associated with the token. Additionally, centralized authorization server 230 may validate the token when the token has been received before a time identified by the expiration timestamp of the token. Additionally, or alternatively, centralized authorization server 230 may validate the token by decrypting the token to identify a signature, and determining that the signature of the token matches the signature inserted by centralized authorization server 230. Based on validating the token and locating the user information, centralized authorization server 230 may provide the user information to target app server 220. As described above, target app server 220 may establish a session with user device 210 based on receiving the user information, and may provide access to the user's account and/or subscription information via the session. Additionally, or alternatively, target app server 220 may provide user device 210 with access to another service. Once access has been provided, user device 210 may select to modify account and/or subscription information.

Process 400 may further include receiving and storing updated user information and credentials (block 490). For example, centralized authorization server 230 may receive updated user information from target app server 220 when user information regarding the user and/or services that the user is permitted to access is changed. Centralized authorization server 230 may synchronize and store the updated user information so that centralized authorization server 230 stores up-to-date user information. Also, centralized authorization server 230 may receive authentication credentials associated with the user's account and/or service provided by target app server 220, and may store an association between the authentication credentials and the token. In some implementations, blocks 430-450 may be omitted, for example, when centralized authorization server 230 validates the authentication credentials as described above in block 420.

Figure 5A:
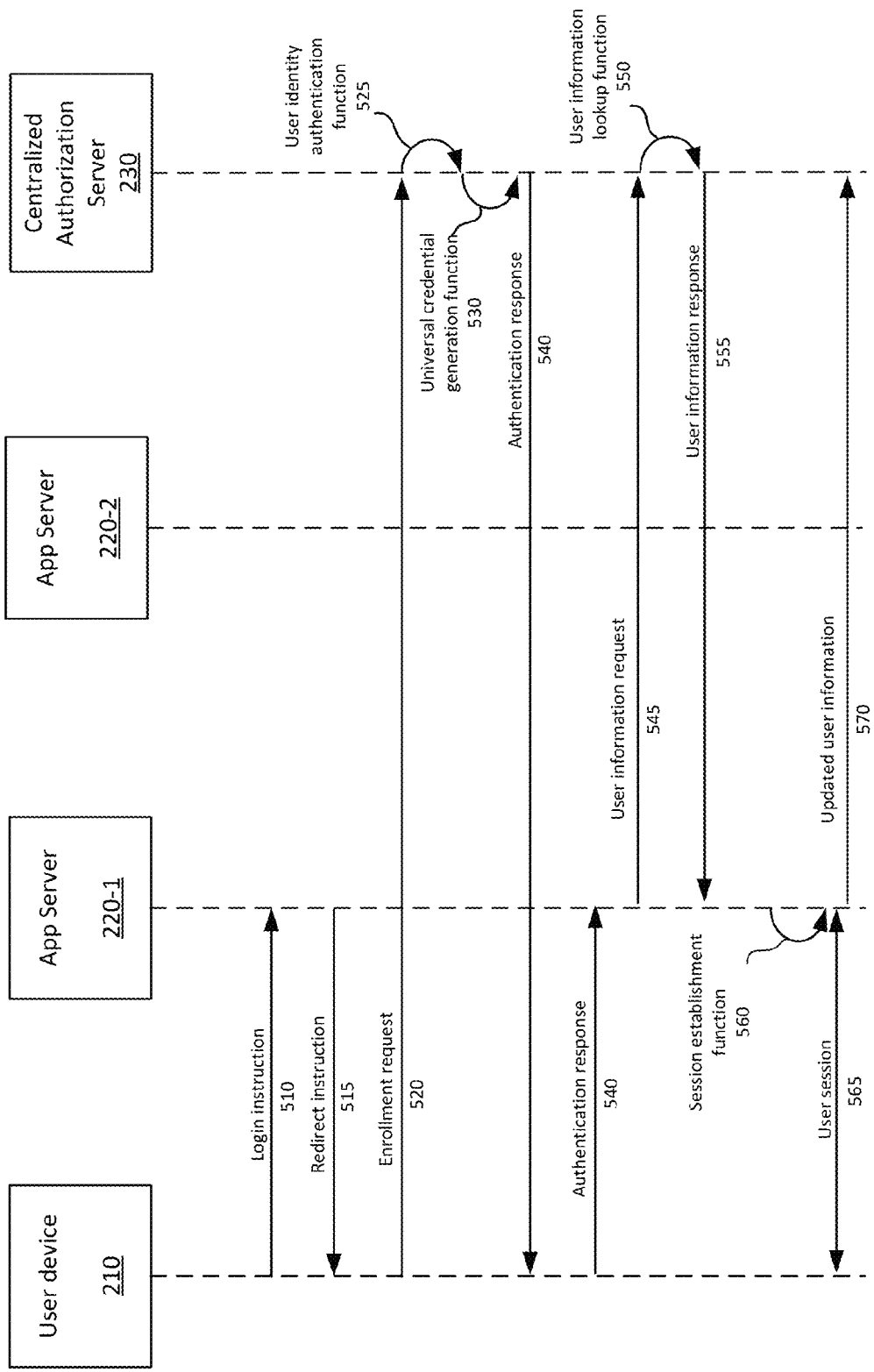
FIGS. 5A and 5B illustrates a signal flow diagram of example operations for enrolling universal credentials and providing access to multiple different services using the universal credentials.
Figure 5B:
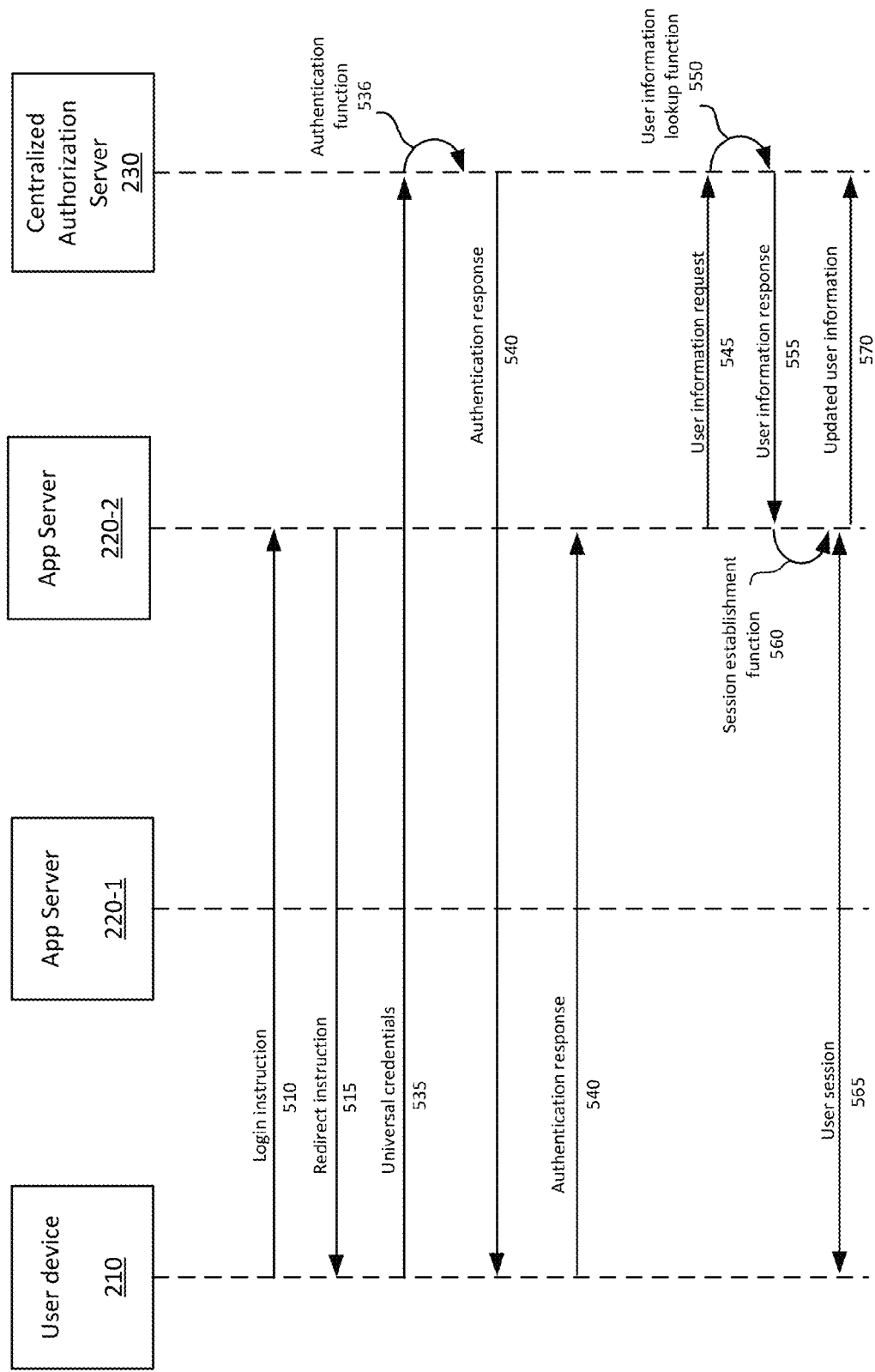

FIGS. 5A and 5B illustrates a signal flow diagram of example operations for enrolling universal credentials and providing access to multiple different services using the universal credentials. As shown in FIG. 5A, user device 210 may provide login instruction 510 to app server 220-1. In some implementations, login instruction 510 may include a request to access a service associated with app server 220-1. For example, user device 210 may provide login instruction 510 from a login page, associated with app server 220-1, via a web browser, an application, or the like. As further shown in FIG. 5A, app server 220-1 may provide redirect instruction 515 based on receiving login instruction 510. In some implementations, redirect instruction 515 may redirect user device 210 from a login page of app server 220-1 to a login page associated with centralized authorization server 230.

In some implementations, user device 210 may receive a selection (e.g., from a user of user device 210) to enroll universal credentials in order to access multiple different services. Based on receiving the selection, user device 210 may provide enrollment request 520 to centralized authorization server 230. In some implementations, enrollment request 520 may include user information regarding the user (e.g., the user's name, address, etc.). In some implementations, enrollment request 520 may include authentication credentials for one or more services that may be linked to universal credentials.

Centralized authorization server 230 may receive enrollment request 520, and may authenticate an identity of the user that provided enrollment request 520 (e.g., as part of user identity authentication function 525). For example, centralized authorization server 230 may provide, to user device 210, a series of challenge questions (e.g., questions based on the user information and relating to the user's background). Centralized authorization server 230 may receive responses to the challenge questions, and may authenticate the user when the responses to challenge questions are correct answers to the challenge questions. Additionally, or alternatively, centralized authorization server 230 may authenticate the user using some other technique.

Based on authenticating the user's identity, centralized authorization server 230 may generate universal credentials (universal credential generation function 530). In some implementations, centralized authorization server 230 may generate the universal credentials based on user input received from user device 210. Alternatively, centralized authorization server 230 generate the universal credentials without user input. In some implementations, centralized authorization server 230 may provide a notification to user device 210 that the universal credentials have been enrolled and are available for use. In some implementations, the notification may identify the universal credentials (e.g., a username, a password, and/or some other information regarding the universal credentials). In some implementations, centralized authorization server 230 may provide the universal credentials to user device 210 as a digital file or certificate.

In some implementations, centralized authorization server 230 may generate a token and associate the universal credentials with the token. Further, centralized authorization server 230 may generate an association between the token, the universal credentials, and the user information included in enrollment request 520. In some implementations, centralized authorization server 230 may insert, in the token, a signature and/or an expiration timestamp. In some implementations, centralized authorization server 230 may generate an updated token after the token has expired, and may generate an association between the updated token, the user information, and/or the universal credentials. In some implementations, centralized authorization server 230 may embed the user information in the token.

Centralized authorization server 230 may encrypt the token and provide the token to user device 210 (e.g., via a secure channel) as part of authentication response 540. User device 210 may provide authentication response 540 to app server 220-1 (e.g., as part of a request to access a service associated with app server 220-1).

If the token does not include information that app server 220-1 may use to authorize user device 210 to access the service, app server 220-1 may provide user information request 545 to centralized authorization server 230 to request user information from centralized authorization server 230. In some implementations, user information request 545 may include the token and a request for the user information associated with the token. In some implementations, centralized authorization server 230 may locate (e.g., in a data structure) the user information associated with the token (e.g., as part of user information lookup function 550). Additionally, centralized authorization server 230 may validate the token when the token has been received before a time identified by the expiration timestamp of the token. Additionally, or alternatively, centralized authorization server 230 may validate the token by decrypting the token to identify a signature, and determining that the signature of the token matches the signature inserted by centralized authorization server 230. Based on validating the token and locating the user information, centralized authorization server 230 may provide user information response 555, including the user information.

If on the other hand, the token includes the user information, app server 220-1 may not need to request the user information from centralized authorization server 230. App server 220-1 may perform session establishment function 560 based on the user information (e.g., when the user information is included in the token or when the user information is provided to app server 220-1 as part of user information response 555, in response to user information request 545). As part of session establishment function 560, app server 220-1 may identify an account, subscription information, authorized services, etc., based on the user information. For example, as described above, the user information may include a user's name, address, etc. Additionally, or alternatively, the user information may not include information that may identify the user, but may include information identifying services that the user may access (e.g., an anonymous identifier).

Based on the user information, app server 220-1 may establish user session 565, and provide user device 210 with access to an account, subscription information, and/or other service via user session 565. In some implementations, the user may update user information via user session 565. In some implementations, app server 220-1 may provide updated user information 570 to centralized authorization server 230 (e.g., when user information regarding the user and/or services that the user is permitted to access is changed). Centralized authorization server 230 may synchronize and store the updated user information so that centralized authorization server 230 stores up-to-date user information. Also, updated user information 570 may include authentication credentials for the service associated with app server 220-1. In some implementations, centralized authorization server 230 may generate an association between the universal credentials, token 540, and the authentication credentials for the service associated with app server 220-1.

In some implementations, the universal credentials may be used to access another service associated with app server 220-2. For example, referring to FIG. 5B, user device 210 may provide login instruction 510 as part of a request to access a service associated with app server 220-2. As further shown in FIG. 5B, app server 220-2 may provide redirect instruction 515 to direct user device 210 to a login page associated with centralized authorization server 230. In some implementations, the user of user device 210 may input universal credentials 535. For example, the user may input characters corresponding to universal credentials 535. Additionally, or alternatively, the user may select to upload universal credentials 535 in the form of a digital file or certificate. User device 210 may then provide universal credentials 535 to centralized authorization server 230.

In some implementations, centralized authorization server 230 may validate universal credentials 535 (authentication function 536) (e.g., by determining that universal credentials 535 have been enrolled when universal credentials 535 are stored by centralized authorization server 230). In some implementations, centralized authorization server 230 may identify provide authentication response 540 to user device 210. In some implementations, authentication response 540 may include a token and/or user information corresponding to universal credentials 535. As shown in FIG. 5B, user device 210 may provide authentication response 540 to app server 220-2. In a similar manner as described above, app server 220-2 may provide user information request 545 to centralized authorization server 230, and may receive user information response 555 (e.g., based on centralized authorization server 230 locating the user information, associated with the token included in authentication response 540, and validating the token as part of user information lookup function 550). Further, app server 220-2 may identify the user of user device 210 based on the user information included in user information response 555, and establish user session 565. Further, app server 220-2 may provide updated user information 570 to centralized authorization server 230, so that centralized authorization server 230 may generate an association between authentication credentials of the service provided by app server 220-2 with the universal credentials and/or with the token.

Figure 6:
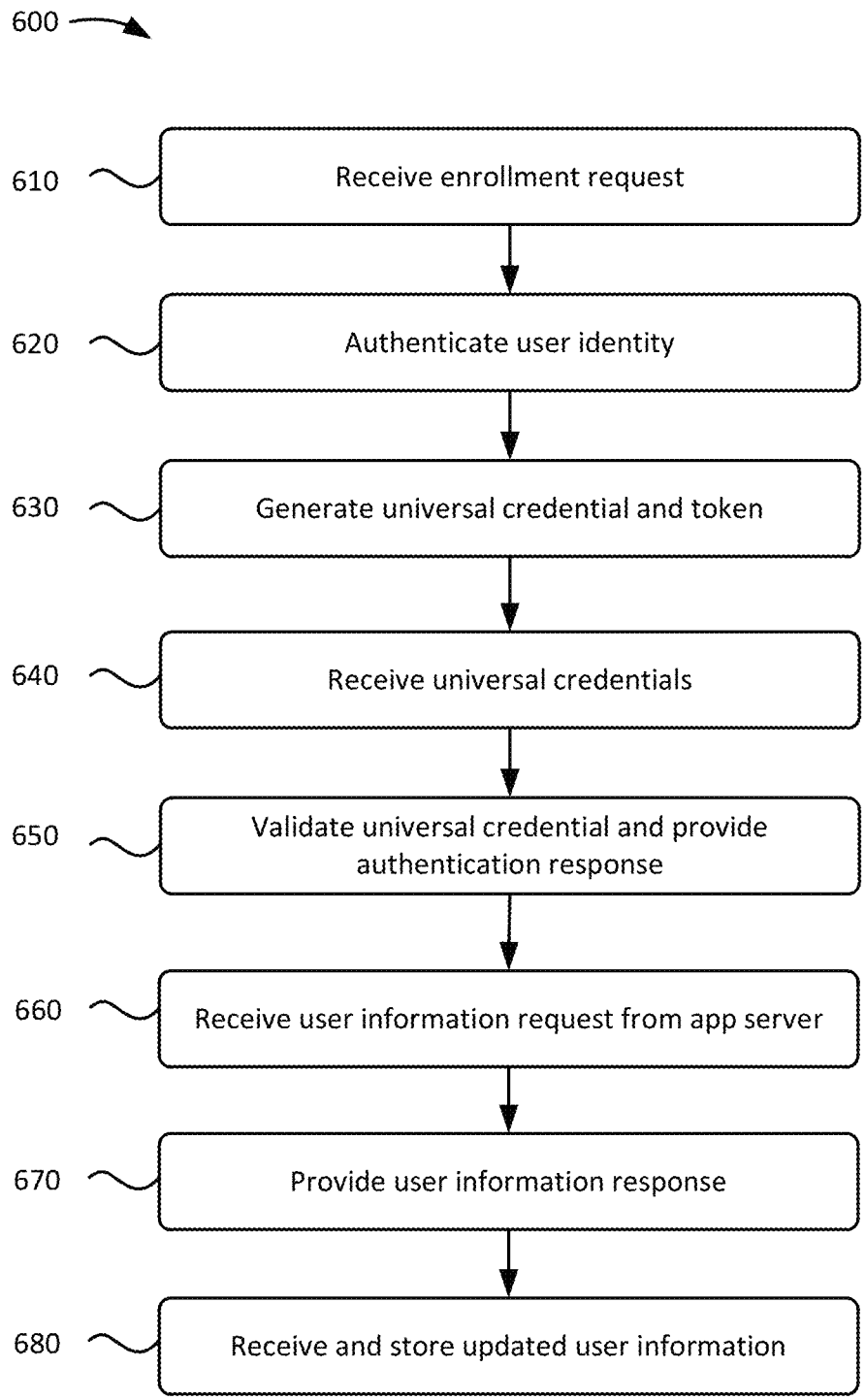
FIG. 6 illustrates a flowchart of an example process for enrolling universal credentials, and providing user information based on receiving a token corresponding to the universal credentials.

FIG. 6 illustrates a flowchart of an example process 600 for enrolling universal credentials, and providing user information based on receiving a token corresponding to the universal credentials. In one implementation, process 600 may be performed by one or more components of centralized authorization server 230. In another implementation, some or all of blocks of process 600 may be performed by one or more components of another device in environment 200 (e.g., user device 210 and/or app server 220), or a group of devices including or excluding app server 220.

As shown in FIG. 6, process 600 may include receiving an enrollment request (block 610). For example, as described above, centralized authorization server 230 may receive the enrollment request from user device 210. In some implementations, the enrollment request may include user information regarding the user (e.g., the user's name, address, etc.). In some implementations, the enrollment request may include authentication credentials for one or more services that may be linked to universal credentials.

Process 600 may also include authenticating the user's identity (block 620). For example, as described above, centralized authorization server 230 may authenticate the identity of the user that provided the enrollment request (e.g., as part of a user identity authentication function). For example, centralized authorization server 230 may provide, to user device 210, a series of challenge questions (e.g., questions based on the user information and relating to the user's background). Centralized authorization server 230 may receive responses to the challenge questions, and may authenticate the user when the responses to challenge questions are correct answers to the challenge questions. Additionally, or alternatively, centralized authorization server 230 may authenticate the user using some other technique.

Process 600 may further include generating a universal credential and token (block 630). For example, as described above, centralized authorization server 230 may generate the universal credentials and the token based on authenticating the user's identity. In some implementations, centralized authorization server 230 may generate the universal credentials based on user input received from user device 210. Alternatively, centralized authorization server 230 generate the universal credentials without user input. In some implementations, centralized authorization server 230 may provide a notification to user device 210 that the universal credentials have been enrolled and are available for use. In some implementations, the notification may identify the universal credentials (e.g., a username, a password, and/or some other information regarding the universal credentials). In some implementations, centralized authorization server 230 may provide the universal credentials to user device 210 as a digital file or certificate.

In some implementations, centralized authorization server 230 may associate the universal credentials with the token. Further, centralized authorization server 230 may generate an association between the token and the user information included in the enrollment request. Additionally, or alternatively, centralized authorization server 230 may generate an association between the token and authentication credentials included in the enrollment request. In some implementations, centralized authorization server 230 may insert, in the token, a signature and/or an expiration timestamp. In some implementations, centralized authorization server 230 may embed the user information in the token.

Process 600 may also include receiving universal credentials (block 640). For example, as described above, centralized authorization server 230 may receive the universal credentials from user device 210 (e.g., when user device 210 provides the universal credentials as part of a request to access a service associated with app server 220).

Process 600 may further include validating the universal credentials and providing an authentication response (block 650). For example, as described above, centralized authorization server 230 may validate the universal credentials (e.g., by determining that the universal credentials have been enrolled when the universal credentials are stored by centralized authorization server 230). In some implementations, centralized authorization server 230 may identify the token, corresponding to the universal credentials, and provide the token to user device 210 as part of the authentication response.

Process 600 may also include receiving a user information request from an app server (block 660). For example, as described above, centralized authorization server 230 may receive the user information request from app server 220. In some implementations, the user information request may include the token and a request for the user information. In some implementations, centralized authorization server 230 may locate (e.g., in a data structure) the user information associated with the token. Additionally, centralized authorization server 230 may validate the token when the token has been received before a time identified by the expiration timestamp of the token. Additionally, or alternatively, centralized authorization server 230 may validate the token by decrypting the token to identify a signature, and determining that the signature of the token matches the signature inserted by centralized authorization server 230.

Process 600 may further include providing a user information response (block 670). For example, as described above, centralized authorization server 230 may provide the user information response (e.g., based on validating the token and locating the user information). Based on the user information response, app server 220 may establish a user session with user device 210, and provide user device 210 with access to an account, subscription information, and/or other service via the user session. In some implementations, the user may update user information via the user session. In some implementations, app server 220 may provide updated user information to centralized authorization server 230 (e.g., when user information regarding the user and/or services that the user is permitted to access is changed). Also, app server 220 may provide authentication credentials for the service associated with app server 220.

Process 600 may also include receiving and storing the updated credentials (block 680). For example, as described above, centralized authorization server 230 may store the updated credentials (including the authentication credentials for the service associated with app server 220), and may generate an association between the universal credentials, the token, and the authentication credentials for the service associated with app server 220.

FIG. 7 illustrates an example data structure 700 that store associations between credentials, user information, and tokens. In some implementations, data structure 700 may be stored in a memory of centralized authorization server 230. In some implementations, data structure 700 may be stored in a memory separate from, but accessible by, centralized authorization server 230 (e.g., a "cloud" storage device). In some implementations, data structure centralized authorization server 230 may be stored by some other device in environment 200, such as user device 210 and/or app server 220. A particular instance of data structure 700 may contain different information and/or fields than another instance of data structure 700.

As shown in FIG. 7, data structure 700 may store a list of credentials, user information associated with the list of credentials, and a token associated with the list of credentials and the user information. In some implementations, information stored by data structure 700 may be based on associations generated by centralized authorization server 230 between credentials, user information, and tokens, as described above. As an example, assume that a first set of authentication credentials ("credentials 1") for a first user are associated with a first service ("service 1"). For example, credentials 1 may be used to provide the first user access to service 1. Further, assume that for the first user, a second set of authentication credentials ("credentials 2" are associated with a second service ("service 2"). Further, assume that universal credentials have been enrolled for the first user ("universal credentials 1"). Given these assumptions, data structure 700 may store information that associates universal credentials 1, credentials 1, and credentials 2 with user information for the first user ("user information 1"). Further, data structure 700 may store information associating a token with user information 1, universal credentials 1, credentials 1, and credentials 2. In some implementations, centralized authorization server 230 may provide a token to user device 210 when receiving credentials included in centralized authorization server 230. Further, centralized authorization server 230 may provide user information to app server 220 when receiving a token identified in data structure 700.

While particular fields are shown in a particular format in data structure 700, in practice, data structure 700 may include additional fields, fewer fields, different fields, or differently arranged fields than are shown in FIG. 7. Also, FIG. 7 illustrates examples of information stored by data structure 400. In practice, other examples of information stored by data structure 400 are possible.

Figure 8:
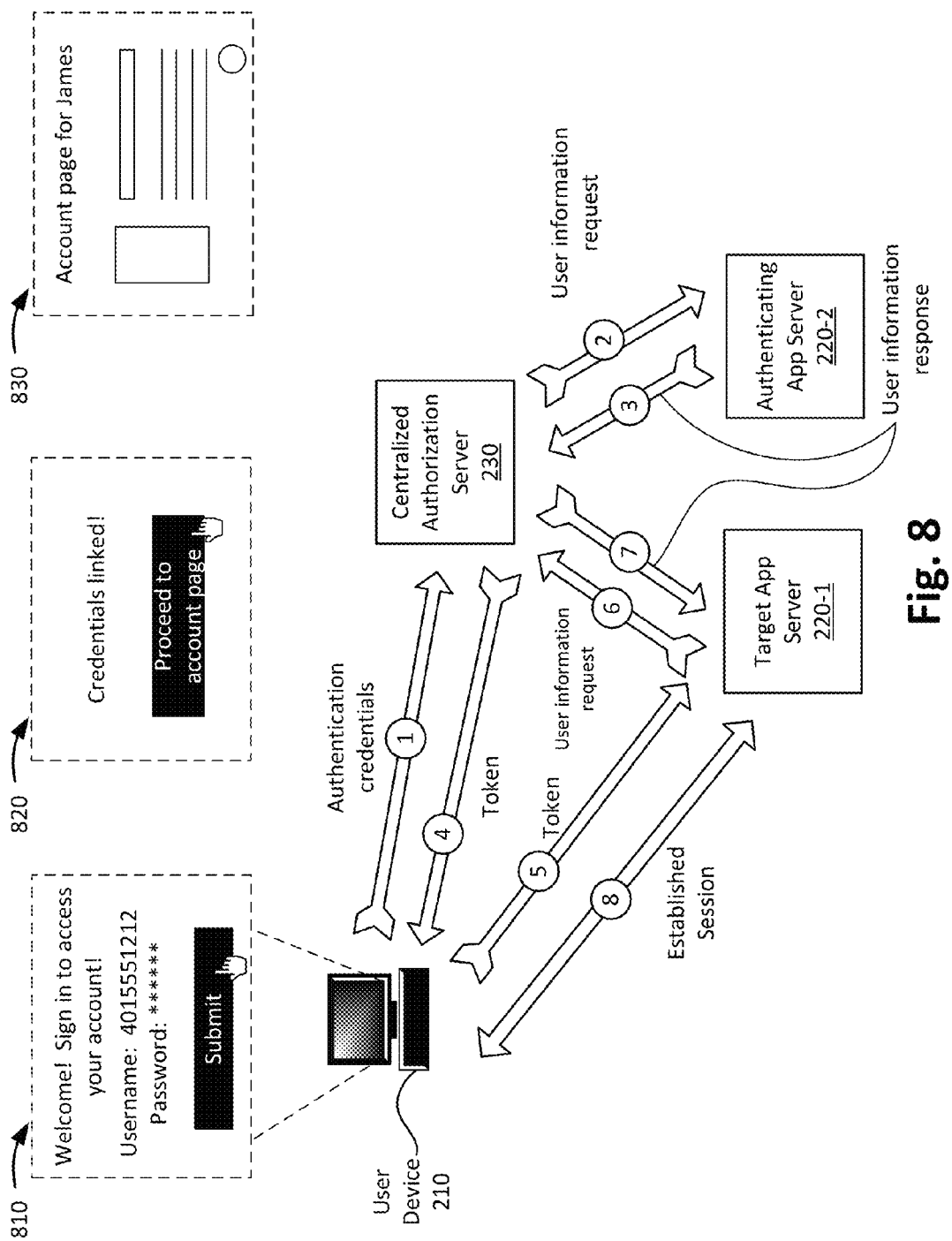
FIG. 8 illustrates an example implementation for accessing a first service using credentials associated with a second service and not associated with the first service.

FIG. 8 illustrates an example implementation for accessing a first service using credentials associated with a second service and not associated with the first service. As shown in interface 810 of FIG. 8, user device 210 may present a login page to permit a user to input authentication credentials to access a service. For example, user device 210 may present the login page when the user selects to access a first service associated with target app server 220-1. In FIG. 8, assume that the user inputs authentication credentials for a second service associated with authenticating app server 220-2. Given this assumption, user device 210 may provide the authentication credentials to centralized authorization server 230 (as shown in arrow "1"). As described above, centralized authorization server 230 may identify authenticating app server 220-2 based on a format of the authentication credentials. In FIG. 8, assume that the authentication credentials include a telephone number. Further, assume that authenticating app server 220-2 may validate authentication credentials that include a telephone number. Given these assumptions, centralized authorization server 230 may provide a user information request to app server 220-2 (as shown in arrow "2"). As described above, the user information request may include the authentication credentials.

In some implementations, app server 220-2 may validate the authentication credentials, and may provide a user information response (as shown in arrow "3"). Based on receiving the user information response, centralized authorization server 230 may generate a token, and associate the token with user information included in the user information response and with the authentication credentials. Centralized authorization server 230 may provide the token to user device 210 (as shown in "4"), and user device 210 may provide the token to app server 220-1 (as shown in "5"). Further, user device 210 may present an indication that account credentials for the second service have been linked to account credentials for the first service (e.g., as shown in interface 820).

Based on receiving the token, app server 220-1 may provide a user information request to centralized authorization server 230 (as shown in "6"). Centralized authorization server 230 may identify the user information, associated with the token, and provide a user information response to app server 220-1 (as shown in "7"). Based on the user information response, app server 220-1 may identify account information associated with the user information, establish a session with user device 210, and present the account information in an account page (e.g., as shown in interface 830).

While a particular example is shown in FIG. 8, the above description is merely an example implementation. In practice, other examples are possible from what is described above in FIG. 8. Also, while a particular format of interfaces 810-830 is shown, in practice, interfaces 810-830 may have a different format and appearance than what is shown in FIG. 8.

FIG. 9 is a diagram of example components of device 900. One or more of the devices described above (e.g., with respect to FIGS. 1A, 1B, 2, 3A, 3B, 5A, 5B, and 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 3A, 3B, 4, 5A, 5B, and 6, the order of the blocks and/or signal flows may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim 1 1isted below may directly depend on only one other claim, the disclosure of the possible implementations includes each dependent claim in combination with every other claim in the claim set.

Further, while certain connections or devices are shown (e.g., in FIGS. 2A, 2B, and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a first server device and from a user device, a request to authenticate the user device for a first service using first authentication credentials for a second service that is different than the first service;
   providing, by the first server device, the first authentication credentials to a second server device that provides the second service;
   receiving, by the first server device, from the second server device, and when the first authentication credentials are valid for the second service, user information relating to a user of the user device;
   generating, by the first server device and in response to receiving the user information, a token that logically associates the user of the user device, the first authentication credentials for the second service, and the user information;
   providing, by the first server device and to the user device, an authentication response, associated with the user information, that provides authentication of the user device for the first service;
   providing the token as part of the authentication response;
   receiving the token from a third server device that provides the first service;
   providing the user information to the third server device to cause the third server device to provide the user device with access to the first service;
   receiving, from the third server device, second authentication credentials, associated with the second service, based on providing the user information to the third server device;
   associating the second authentication credentials with the token;
   receiving the second authentication credentials from the user device;
   identifying the token based on receiving the second authentication credentials from the user device;
   providing the token to the user device based on identifying the token;
   receiving the token from the second server device based on providing the token; and
   providing the user information to the second server device to cause the second server device to provide the user device with access to the first service.

2. The method of claim 1, further comprising:
   validating the token based on receiving the token from the third server device,
      wherein validating the token includes:
         determining that the token is unexpired, or
         determining that a signature, included in the token, matches a signature inserted in the token by the first server device.

3. The method of claim 1, further comprising:
   generating an association between the authentication credentials and the token after generating the token; and
   identifying the token based on receiving the authentication credentials;
   wherein providing the token is based on identifying the token.

4. The method of claim 1, further comprising:
   identifying the second server device based on a format of the authentication credentials,
   wherein providing the authentication credentials to the second server device is based on identifying the second server device.

5. The method of claim 1, wherein the second server device is one of a plurality of second server devices,
   wherein providing the authentication credentials includes providing the authentication credentials to the plurality of second server devices,
   wherein receiving the user information includes receiving the user information from the one of the plurality of second server devices when the authentication credentials are stored by the one of the plurality of second server devices.

6. The method of claim 1, wherein the first service or the second service includes an account management service or a content delivery service.

7. A system comprising:
   a first server device to:
      receive, from a user device, a request to authenticate the user device for a first service using first authentication credentials for a second service that is different than the first service;
      provide the first authentication credentials to a second server device that provides the second service;
      receive from the second server device, and when the first authentication credentials are valid for the second service, user information relating to a user of the user device;
      generate, in response to receiving the user information, a token that logically associates the user of the user device, the first authentication credentials for the second service, and the user information;
      provide, to the user device, an authentication response, associated with the user information, that provides authentication of the user device for the first service;
      provide the token as part of the authentication response;
      receive the token from a third server device that provides the first service;
      provide the user information to the third server device to cause the third server device to provide the user device with access to the first service;
      receive, from the third server device, second authentication credentials, associated with the second service, based on providing the user information to the third server device;
      associate the second authentication credentials with the token;
      receive the second authentication credentials from the user device;

identify the token based on receiving the second authentication credentials from the user device;

provide the token to the user device based on identifying the token;

receive the token from the second server device based on providing the token; and provide the user information to the second server device to cause the second server device to provide the user device with access to the first service.

8. The system of claim 7, wherein the first server device is further to:

validate the token based on receiving the token from the third server device,
wherein when validating the token, the first server device is to:
determine that the token is unexpired, or
determine that a signature, included in the token, matches a signature inserted in the token by the first server device.

9. The system of claim 7, wherein the first server device is further to:

generate an association between the authentication credentials and the token after generating the token; and
identify the token based on receiving the authentication credentials;
wherein when providing the token, the first server device is to provide the token based on identifying the token.

10. The system of claim 7, wherein the first server device is further to:

identify the second server device based on a format of the authentication credentials,
wherein when providing the authentication credentials to the second server device, the first server device is to provide the authentication credentials based on identifying the second server device.

11. The system of claim 7, wherein the second server device is one of a plurality of second server devices, wherein when providing the authentication credentials, the first server device is to provide the authentication credentials to the plurality of second server devices,
wherein when receiving the user information the first server device is to receive the user information from the one of the plurality of second server devices when the authentication credentials are stored by the one of the plurality of second server devices.

12. A system comprising:

a first server device to:
receive, from a user device, an enrollment request including user information regarding a user;
authenticate an identity of the user associated with the enrollment request;
generate universal credentials, for the user, based on authenticating the identity, the universal credentials including a logical association between credentials for a first service provided by a second server, credentials for a second service provided by a third server, and the identity of the user;
provide, to the user device and in response to the enrollment request, an authentication response, based on the generated universal credentials, that provides authentication of the user device for the first service provided by the second server device and for the second service that is different from the first service and that is provided by third server device;
generate a token based on generating the universal credentials;
generate an association between the universal credentials and the token;
receive the universal credentials from the user device after generating the association between the universal credentials and the token;
identify the token associated with the universal credentials;
provide, based on identifying the token, the token to the user device as part of the authentication response;
receive the token from the second server device or the third server device;
identify the user information associated with the token;
provide the user information to the second server device or the third server device to cause the second server device to provide the user device with access to the first service or the third server device to provide the user device with access to the second service;
receive updated user information, from the second server device or the third server device, for accessing the first service or the second service; and
update the user information associated with the universal credentials for the user.

13. The system of claim 12, wherein the first server device is further to:

receive the universal credentials after generating the universal credentials;
identify the user information associated with the universal credentials,
wherein when providing the authentication response, the first server device is to provide the authentication response based on identifying the user information.

14. The system of claim 12, wherein the first server device is further to: validate the token based on receiving the token from the second server or the third server, wherein when validating the token, the first server device is further to: determine that the token is unexpired, or
determine that a signature, included in the token, matches a signature inserted in the token by the first server device.

15. The system of claim 12, wherein when authenticating the identity of the user, the first server device is further to authenticate the identity based on responses to one or more challenge questions.

* * * * *